United States Patent
Qing-An

(10) Patent No.: US 6,487,409 B2
(45) Date of Patent: *Nov. 26, 2002

(54) HANDOFF CONTROL SYSTEM HANDOFF CONTROL METHOD, AND STORAGE MEDIUM STORING HANDOFF CONTROL PROGRAM

(75) Inventor: Zeng Qing-An, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/285,061

(22) Filed: Apr. 2, 1999

(65) Prior Publication Data

US 2002/0068568 A1 Jun. 6, 2002

(30) Foreign Application Priority Data

Apr. 10, 1998 (JP) .......................... 10-099211

(51) Int. Cl.[7] ................................ H04Q 7/20
(52) U.S. Cl. ............... 455/436; 455/435; 455/560
(58) Field of Search ................... 455/436, 437, 455/440, 560, 527, 441, 445, 455, 456

(56) References Cited

U.S. PATENT DOCUMENTS

| | | | | | |
|---|---|---|---|---|---|
| 5,465,389 | A | * | 11/1995 | Agrawal et al. | 455/436 |
| 5,535,425 | A | * | 7/1996 | Watanbe | 455/436 |
| 5,640,676 | A | * | 6/1997 | Garncarz et al. | 455/436 |
| 5,790,954 | A | * | 8/1998 | Tayloe et al. | 455/437 |

FOREIGN PATENT DOCUMENTS

| | | |
|---|---|---|
| EP | 669 775 A2 | 8/1995 |
| JP | 2-44929 * | 2/1990 |
| JP | 7-240959 | 9/1995 |
| JP | 7-264656 | 10/1995 |
| WO | WO 93/12588 | 6/1993 |

OTHER PUBLICATIONS

Yi Bing Lin et al., PCS Channel Assignment Strategies for Hand–off and Initial Access, IEEE Personal Communications, 1(1994) 3rd Quarter, No. 3, New York, NY, U.S., 1994.*
Hong , D., et al., "Traffic Model and Performance Analysis for Cellular Mobile Radio Telephone Systems with Prioritized and Nonprioritized Handoff Procedures," IEEE Transactions on on Vehicular Technology, vol. VT–35, No. 3, pp. 77–92 (1986).
Zeng, Q.A., et al., "Performance Analysis of Mobile Cellular Radio System with Priority Reservation Handof Procedures," IEEE Procedures VTC–94, vol. 3, pp. 1829–1833 (1994).
Article "PCS Channel Assignment Strategies for Hand–Off and Initial Access" (Analyzing the Trade–Off Between Implementation Costs and Performance), IEEE Personal Communications, US, IEEE Communications Society, vol. 1, No. 3, pp. 47—56 (Jul. 1, 1994).

* cited by examiner

Primary Examiner—Dwayne Bost
Assistant Examiner—Joy K. Contee
(74) Attorney, Agent, or Firm—Foley & Lardner

(57) ABSTRACT

A handoff control system for performing handoff processing for a terminal that moves across cells of base stations while performing speech communication includes a measuring section, a calculating section, a queue storage section, a request processing section, and a queue control section. The measuring section periodically measures the reception signal strength in the terminal. The calculation section calculates the relative change amount of reception signal strength at measurement time intervals on the basis of the measurement result. The queue storage section stores queues to which priories based on relative change amounts of reception signal strength are assigned. When the terminal generates a handoff request, the request processing section distributes a call from the terminal to one of the queues on the basis of the relative change amount of reception signal strength in the terminal.

17 Claims, 9 Drawing Sheets

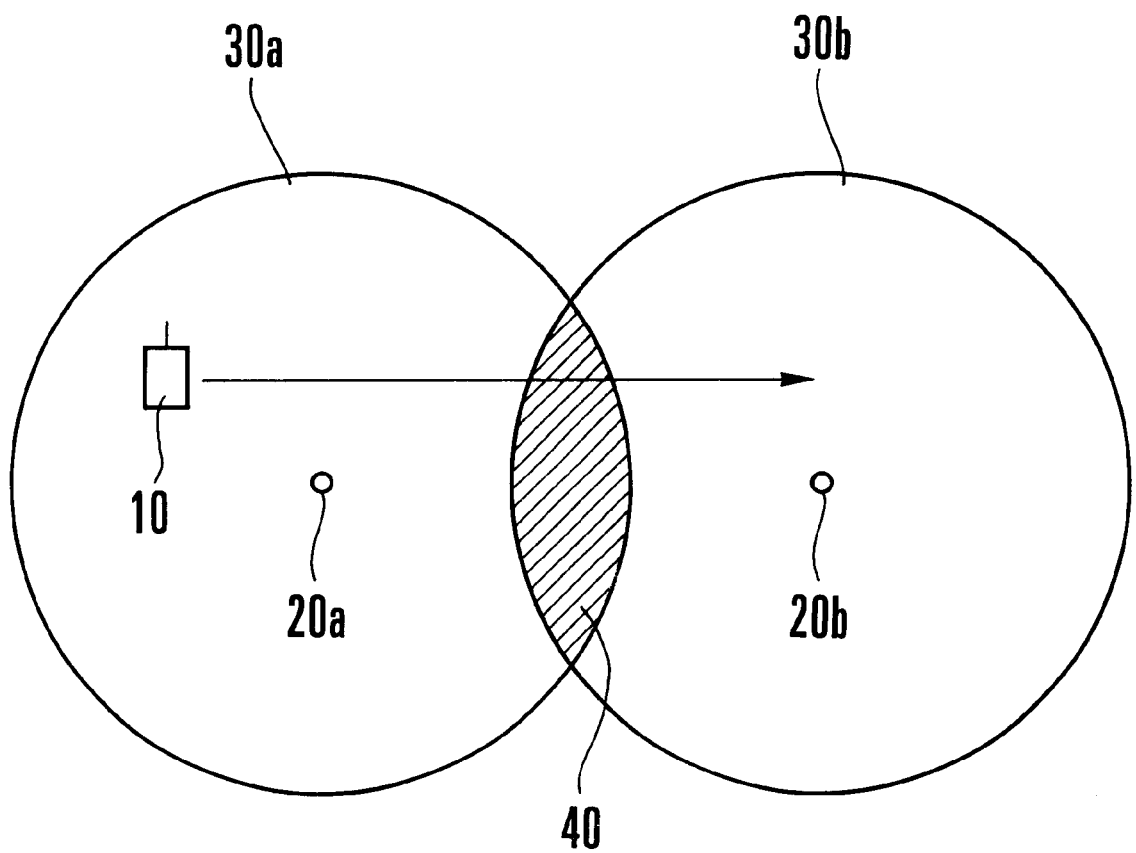
F I G. 1

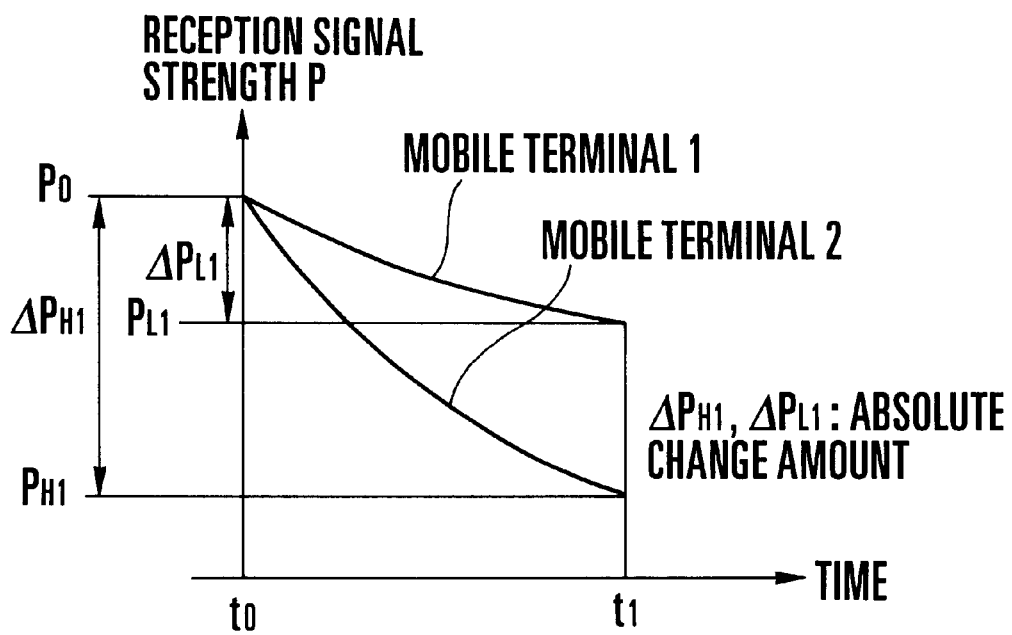
F I G. 2A
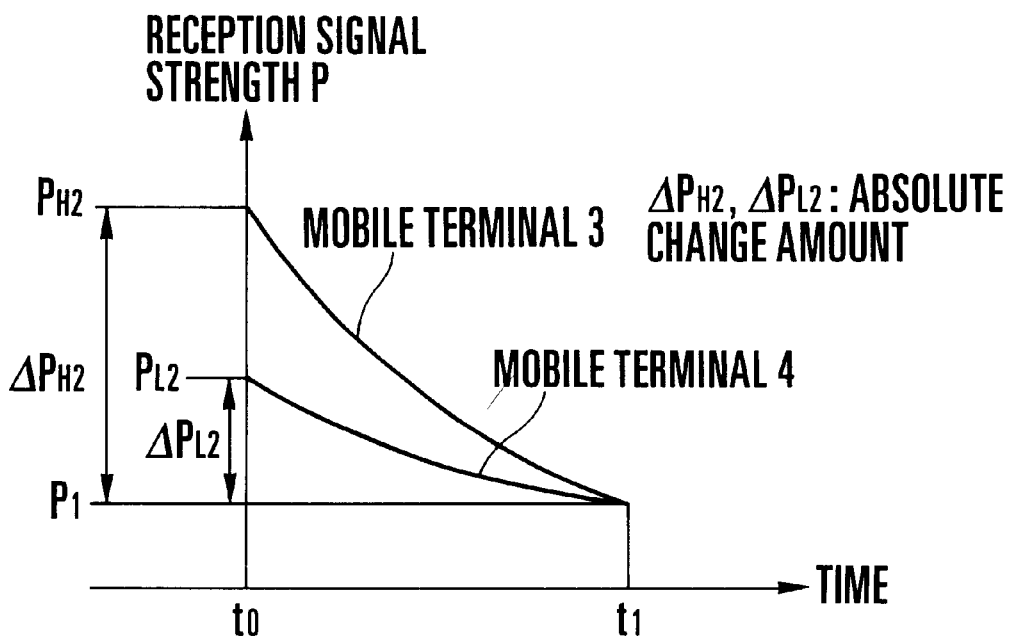
F I G. 2B

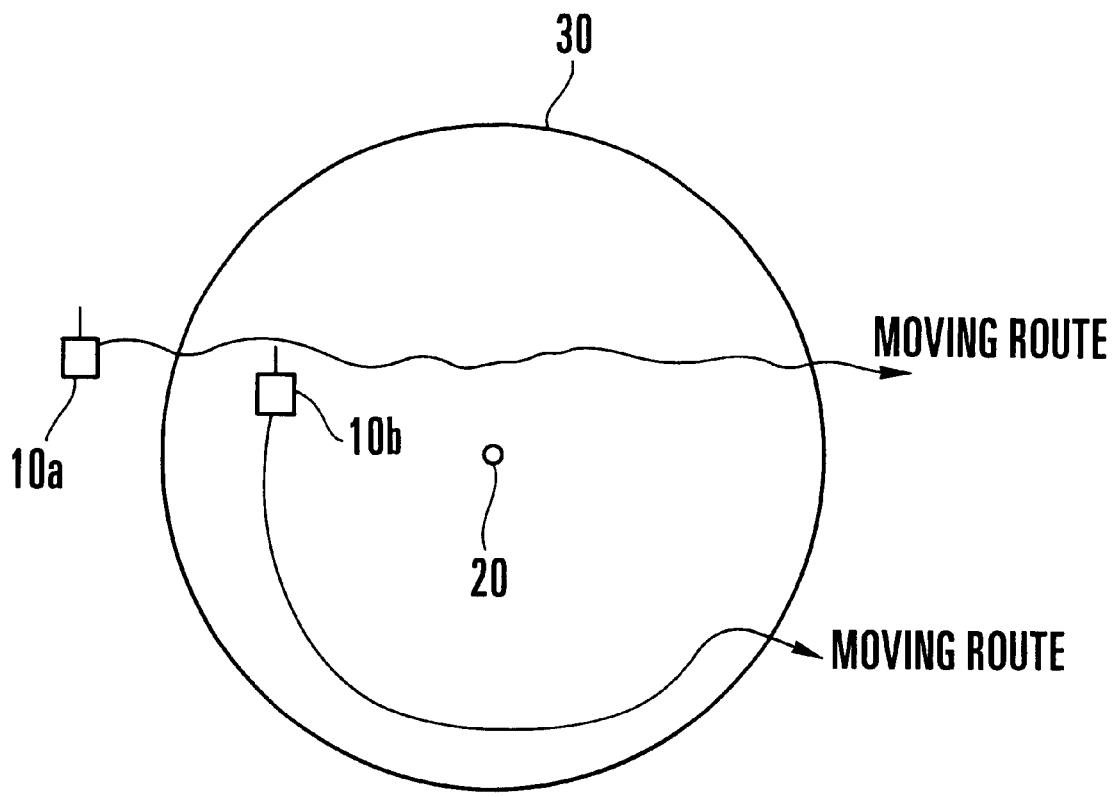
F I G. 8

HANDOFF CONTROL SYSTEM HANDOFF CONTROL METHOD, AND STORAGE MEDIUM STORING HANDOFF CONTROL PROGRAM

BACKGROUND OF THE INVENTION

The present invention relates to a handoff control system in a cellular communication system and, more particularly, to a handoff control system and method which perform handoff processing by assigning priorities.

Recently, the number of subscribers in mobile communication systems is unceasingly on the increase, and hence an increase in subscriber capacity is required. To increase the subscriber capacity of a mobile communication system, a technique of reducing the cell radius has been studied. If the cell radius is reduced, the number of base stations in the service area increases. As a consequence, the number of channels used by subscribers can be increased.

Assume that a terminal 110 is present in a cell 130a of a base station 120a and is receiving service from the base station 120a, and the terminal 110 moves into a cell 130b of a base station 120b, as shown in FIG. 9A. As the terminal 110 moves away from the base station 120a, the reception signal strength from the base station 120a gradually decreases in the terminal 110. In this case, the reception signal strength indicates the magnitude of power received from the base station.

The reception signal strength from the base station 120a is periodically measured in the terminal 110. When the measured reception signal strength becomes equal to or less than a predetermined threshold, the terminal 110 sends a handoff request to the base station 120a. With this operation, the terminal 110 is set in a state in which it can also receive service from the base station 120b.

The handoff request sent from the terminal 110 to the base station 120a is notified from the base station 120a to the base station 120b through a network (not shown). Thereafter, the terminal 110 can receive service from both the base stations 120a and 120b. When the terminal 110 further moves away from the base station 120a, the service from the base station 120a is stopped, and the terminal 110 receives service from only the base station 120b.

An area where the terminal 110 can receive service from both the base stations 120a and 102b is an area 140 where the cells 130a and 130b overlap.

When the cell radius is reduced as shown in FIG. 9B, the above handoff operation is frequently performed. For this reason, as the cell radius decreases, the handoff rate increases, and forced termination of communication tends to occur.

A method of avoiding such a situation by preparing a queue for requests from terminals that demand handoffs is disclosed in, for example, D. Hong et al., "Traffic model and performance analysis for cellular mobile radio telephone systems with prioritized and nonprioritized handoff procedures", IEEE Trans. Veh. Technol., vol. VT-35, August 1986 (reference 1) and Q. A. Zeng et al., "Performance analysis of mobile cellular radio system with priority reservation handoff procedures", IEEE Proc. VTC-94, vol. 3, June 1994 (reference 2).

According to reference 1, of all the set channels, some number of channels are always ensured as handoff channels, and the handoff channels are not used for new calls. With this setting, the loss probability during handoff operation is reduced.

According to reference 2, a buffer for new calls is used in addition to the technique disclosed in reference 1 to decrease the loss probability of new calls without increasing the blocking probability and probability of forced termination of handoff calls much.

In addition, Japanese Patent Laid-Open No. 7-264656 (reference 3) discloses a technique of assigning priorities to handoff processes on the basis of a mathematical expression set in consideration of the moving speeds and directions of terminals, and performing the handoff processes in accordance with the priorities.

Terminals move across cells at various speeds. For example, the moving speed of a terminal that moves on a car differs from that of a terminal carried by a walking user. When the moving speeds of terminals differ in this manner, the time allowed between the instant at which a handoff request is generated and the instant at which the handoff process is completed changes. For this reason, when handoff processes are performed in the order of handoff requests, forced termination of communication may occur at a terminal that is moving at a high speed if the time between the instant at which a handoff request is generated and the instant at which the handoff process is completed is prolonged.

In addition, a terminal that moves at a high speed generates handoff requests many times during one communication operation because it passes many cells in a predetermined period of time, and hence the frequency of forced termination of communication tends to increase.

Furthermore, terminals move across cells through various routes; some terminals move away from the base stations from which service is received, and some terminals move while keeping distances to the base stations constant.

When terminals move through different routes as described above, the time allowed between the instant at which a handoff request is generated and the instant at which the handoff process is completed changes as well. When handoff processes are to be simply performed in the order of handoff requests, a delay in performing a handoff process upon generation of a handoff request may cause forced termination of communication at a terminal that only moves away from the base station from which service is currently received because of a process delay.

In the technique disclosed in reference 3, since complicated arithmetic operation is required to assign priorities, and a priority is assigned to each call, processing for a handoff request is frequently performed and complicated.

SUMMARY OF THE INVENTION

It is an object of the present invention to provide a handoff control system and method which can decrease the probability of forced termination of communication by considering the time allowed between the instant at which a terminal generates a handoff request and the instant at which the handoff process is completed.

In order to achieve the above object, according to the present invention, there is provided a handoff control system for performing handoff processing for a terminal that moves across cells of a plurality of base stations while performing speech communication, comprising measuring means for periodically measuring a reception signal strength in the terminal, calculation means for calculating the relative change amount of reception signal strength at measurement time intervals on the basis of the measurement result output from the measuring means, queue storage means storing, in advance, a plurality of queues to which priorities based on relative change amounts of reception signal strength are assigned, request processing means for, when the terminal generates a handoff request, distributing a call from the terminal to one of the queues on the basis of the relative change amount of reception signal strength in the terminal, and queue control means for, when an available channel is present in an adjacent cell to which the terminal, which generated the request, has moved, assigning the call, distributed into the queue according to the order based on the priority, to the available channel.

BRIEF DESCRIPTION OF THE DRAWINGS

FIG. 1 is a schematic view showing a handoff control system according to an embodiment of the present invention;

FIG. 2A is a graph for explaining a method of calculating reception signal strengths when two terminals move from positions where they have the same reception signal strength in the handoff control system in FIG. 1;

FIG. 2B is a graph for explaining a method of calculating reception signal strengths when two terminals move from positions where they have different reception signal strengths to positions where the reception signal strengths become equal to a handoff threshold in the handoff control system in FIG. 1;

FIG. 8 is a view for explaining control based on the moving routes of terminals in the handoff control system of the present invention;

DESCRIPTION OF THE PREFERRED EMBODIMENT

Figure 3:
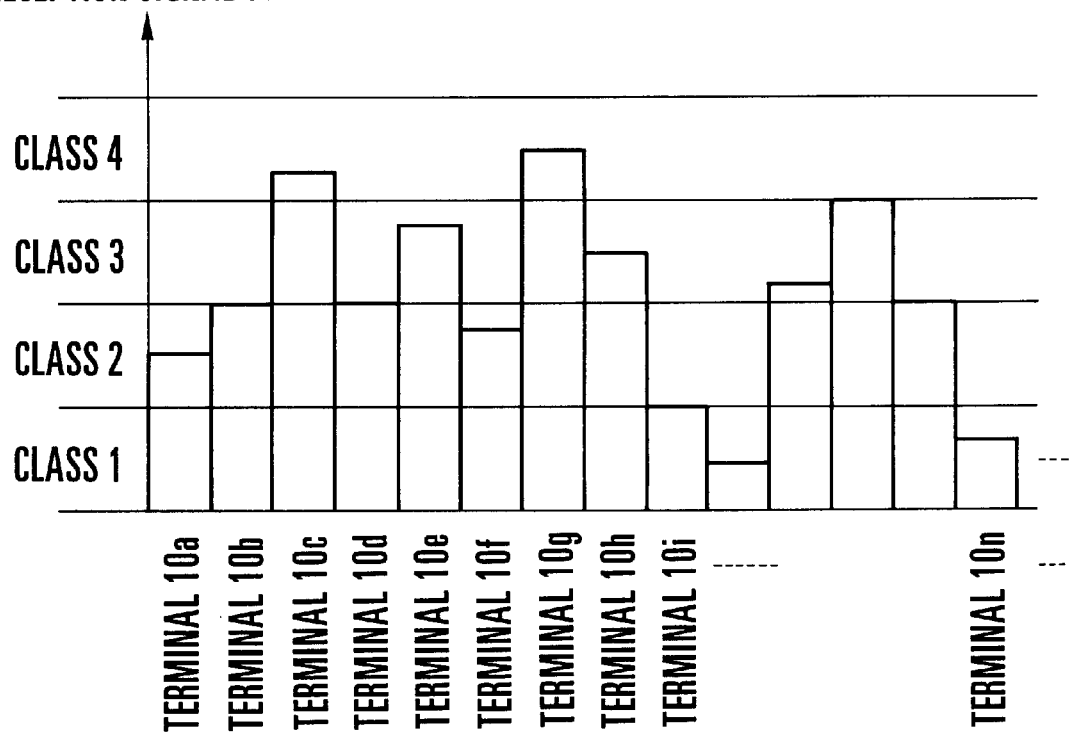
FIG. 3 is a graph for explaining a method of determining the priority order of handoff processes at terminals in the handoff control system in FIG. 1.

The present invention will be described in detail below with reference to the accompanying drawings.

FIG. 1 schematically shows a handoff control system according to an embodiment of the present invention.

Referring to FIG. 1, a terminal 10 located in a cell 30a of a base station 20a is moving toward a cell 30b of a base station 20b adjacent to the base station 20a while receiving service from the base station 20a. At this time, the terminal 10 periodically measures the reception signal strength from the base station 20a, and the relative change amount of reception signal strength is notified to the base station 20a at measurement time intervals. In addition, the relative change amount of reception signal strength is notified from the base station 20a to the base station 20b adjacent to the base station 20a through a network (not shown).

In the base stations 20a and 20b, the relative change amounts of reception signal strength notified from the terminal 10 are stored, and queues to which priorities are assigned on the basis of the relative change amounts of reception signal strength are formed in advance. When a handoff request is output from the terminal 10, the call is distributed to the queue corresponding to the terminal 10. Thereafter, handoff control is performed on the basis of the priority order.

A method of calculating the relative change amount of reception signal strength and a method of determining the priority order will be described next with reference to FIGS. 2A and 2B.

Referring to FIG. 2A, assume that a terminal exhibiting a reception signal strength $P_0$ at time $t_0$ moves to exhibit a reception signal strength $P_{L1}$ at time $t_1$. In this case, the relative change amount is defined as:

$$(P_{L1}-P_0)/(P_{L1}+P_0)$$

Also assume that a terminal exhibiting the reception signal strength $P_0$ at time $t_0$ moves to exhibit a reception signal strength $P_{H1}$ at time $t_1$. In this case, the relative change amount is defined as:

$$(P_{H1}-P_0)/(P_{H1}+P_0)$$

The absolute change amount of reception electric field signal strength at the terminal exhibiting the reception signal strength $P_{L1}$ at time $t_1$ is represented by $\Delta P_{L1}$. The absolute change amount of reception electric field signal strength at the terminal exhibiting the reception signal strength $P_{H1}$ at time $t_1$ is represented by $\Delta P_{H2}$.

The absolute change amount $\Delta P_{H1}$ of reception electric field signal strength at the terminal exhibiting the reception signal strength $P_{H1}$ at time $t_1$ is larger than the absolute change amount $\Delta P_{L1}$ of reception electric field signal strength at the terminal exhibiting the reception signal strength $P_{L1}$ at time $t_1$. That is, the terminal exhibiting the reception signal strength $P_{H1}$ at time $t_1$ moves away from the base station at a higher speed than the terminal exhibiting the reception signal strength $P_{L1}$ at time $t_1$.

When the terminal exhibiting the reception signal strength $P_0$ at time to moves to exhibit the reception signal strength $P_{L1}$ at time $t_1$, the above relative change amount can be defined as:

$$(P_{L1}-P_0)/P_{L1}$$

or $$(P_{L1}-P_0)/P_0$$

When the terminal exhibiting the reception signal strength $P_0$ at time to moves to exhibit the reception signal strength $P_{H1}$ at time $t_1$, the above relative change amount can be defined as:

$$(P_{H1}-P_0)/P_{H1}$$

or $$(P_{H1}-P_0)/P_0$$

Referring to FIG. 2B, assume that a terminal exhibiting a reception signal strength $P_{L2}$ at time $t_0$ moves to exhibit a reception signal strength equal to a handoff threshold $P_1$ at time $t_1$. In this case, the relative change amount is defined as:

$$(P_1-P_{L2})/(t_1-t_0)$$

Assume that a terminal exhibiting a reception signal strength $P_{H2}$ at time $t_0$ moves to exhibit a reception signal strength equal to the handoff threshold $P_1$ at time $t_1$. In this case, the relative change amount is defined as:

$$(P_1-P_{H2})/(t_1-t_0)$$

The absolute change amount of reception electric field signal strength at the terminal exhibiting the reception signal strength $P_{L2}$ at time $t_0$ is represented by $\Delta P_{L2}$. The absolute change amount of reception electric field signal strength at the terminal exhibiting the reception signal strength $P_{H2}$ at time to is represented by $\Delta P_{H2}$.

The absolute change amount $\Delta P_{H2}$ of reception electric field signal strength at the terminal exhibiting the reception signal strength $P_{H2}$ at time $t_0$ is larger than the absolute change amount $\Delta P_{L2}$ of reception electric field signal strength at the terminal exhibiting the reception signal strength $P_{L2}$ at time $t_0$. That is, the terminal exhibiting the reception signal strength $P_{H2}$ at time $t_0$ moves away from the base station at a higher speed than the terminal exhibiting the reception signal strength $P_{L2}$ at time $t_0$.

FIG. 3 explains the method of determining the priority order of handoff processes at terminals in the handoff control system in FIG. 1.

As shown in FIG. 3, the priority assigned to a given terminal is determined on the basis of the magnitude of the relative change amount of reception signal strength at the terminal. The relative change amounts of reception signal strength are classified into four classes depending on the magnitudes. The priority assigned to each terminal is determined depending on which class the relative change amount of reception signal strength at the terminal enters. For example, a terminal 10a belongs to class 2; a terminal 10b, class 3; and a terminal 10c, class 4. The highest priority is assigned to class 4, and the lowest priority is assigned to class 1.

The arrangements of a terminal and base station of the handoff control system in FIG. 1 will be described next with reference to FIGS. 4 and 5.

Figure 4:
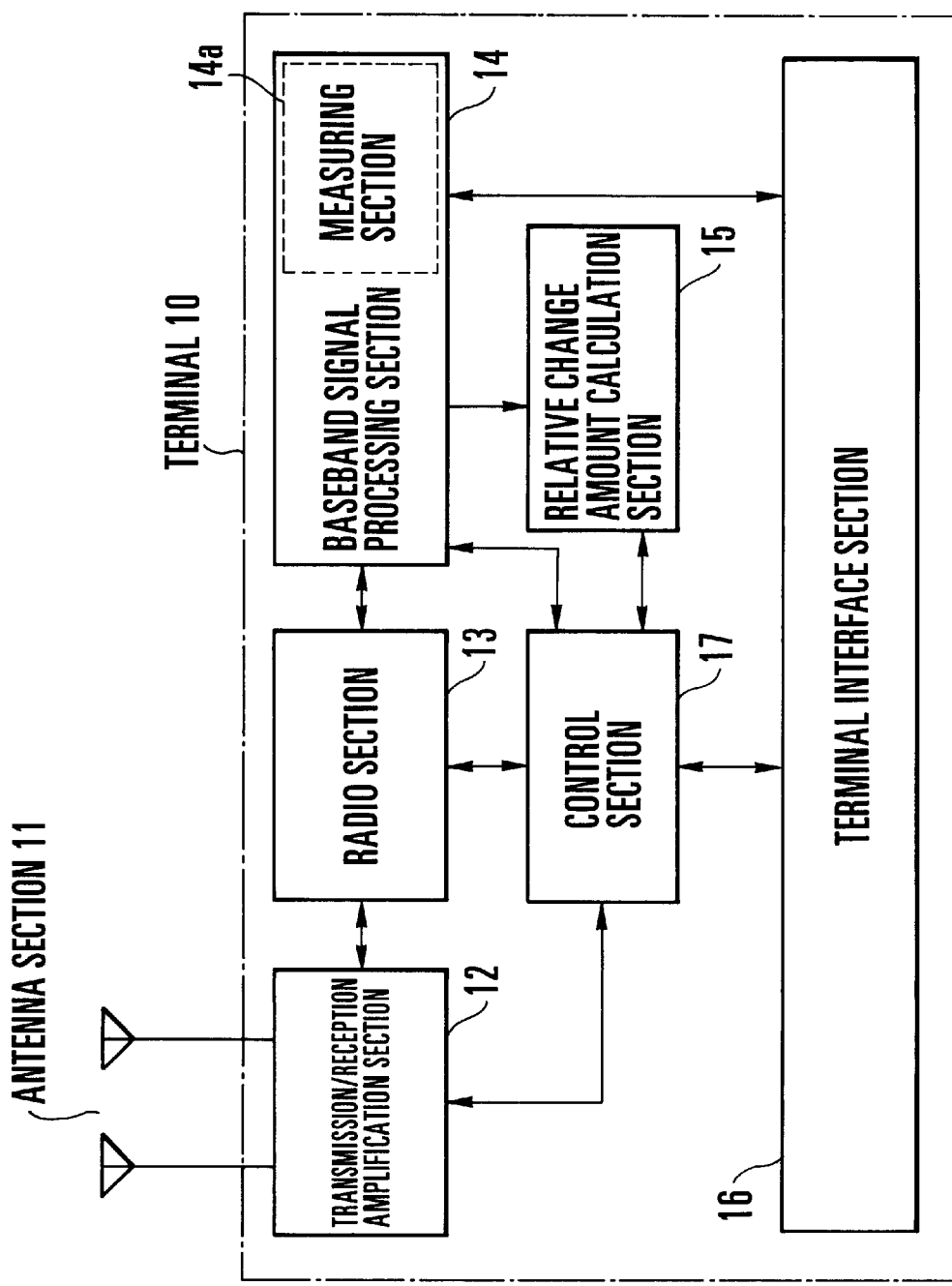
FIG. 4 is a block diagram showing a terminal of the handoff control system in FIG. 1.

As shown in FIG. 4, the terminal 10 is comprised of a pair of antenna sections 11 for receiving and transmitting radio waves, a transmission/reception amplification section 12 connected to the antenna sections 11, a radio section 13 connected to the transmission/reception amplification section 12, a baseband signal processing section 14 connected to the radio section 13, a relative change amount calculation section 15 connected to the baseband signal processing section 14, a terminal interface section 16 connected to the baseband signal processing section 14, and a control section 17.

The transmission/reception amplification section 12 amplifies the reception RF (Radio Frequency) signal received through the antenna section 11 and the transmission RF signal transmitted through the antenna section 11, and demultiplexes the reception and transmission RF signals.

The radio section 13 performs quasi-synchronous detection of the reception RF signal amplified by the transmission/reception amplification section 12 and converts it into a digital signal. In addition, the radio section 13 first converts the transmission signal to be transmitted through the antenna section 11 into an analog signal, and then converts the signal into a transmission RF signal by quadrature modulation.

The baseband signal processing section 14 performs demodulation, synchronization, and error correction decoding of the reception signal converted into the digital signal by the radio section 13, demultiplexing of data, error correction encoding and framing of the transmission signal to be transmitted through the antenna section 11, and baseband signal processing such as data modulation. The baseband signal processing section 14 also includes a measuring section 14a for periodically measuring the strength of a reception signal from the base station 20a.

The relative change amount calculation section 15 calculates the relative change amount of reception signal strength measured by the baseband processing section 14 at measurement time intervals.

The terminal interface section 16 has voice CODEC (coder and decoder) and data adapter functions and interfaces with an externally connected handset or external data terminal (not shown).

The control section 17 performs transmission/reception control of control signals, and controls the transmission/reception amplification section 12, the radio section 13, the baseband processing section 14, the relative change amount calculation section 15, and the terminal interface section 16.

When the terminal 10 having this arrangement is to transmit a signal to the base station 20a, the signal input through the terminal interface section 16 is subjected to baseband signal processing in the baseband processing section 14. Thereafter, the baseband signal output from the baseband processing section 14 is converted into an analog signal by the radio section 13. The analog signal output from the radio section 13 is amplified by the transmission/reception amplification section 12. The amplified signal is transmitted to the base station 20a through the antenna section 11.

When the signal transmitted from the base station 20a is to be received, the signal received through the antenna section 11 is amplified by the transmission/reception amplification section 12. The amplified signal is converted into a digital signal by the radio section 13 upon quasi-synchronous detection. The digital signal output from the radio section 13 is subjected to baseband processing in the baseband processing section 14 and output through the terminal interface section 16.

The measuring section 14a of the baseband processing section 14 periodically measures the reception signal strength from the base station 20a. The relative change calculation section 15 calculates the relative change amount of strength of the reception signal output from the baseband processing section 14. The reception signal strength measured by the baseband processing section 14 and the relative change amount of reception signal strength calculated by the relative change calculation section 15 are simultaneously notified to the base station 20a in a predetermined cycle.

Figure 5:
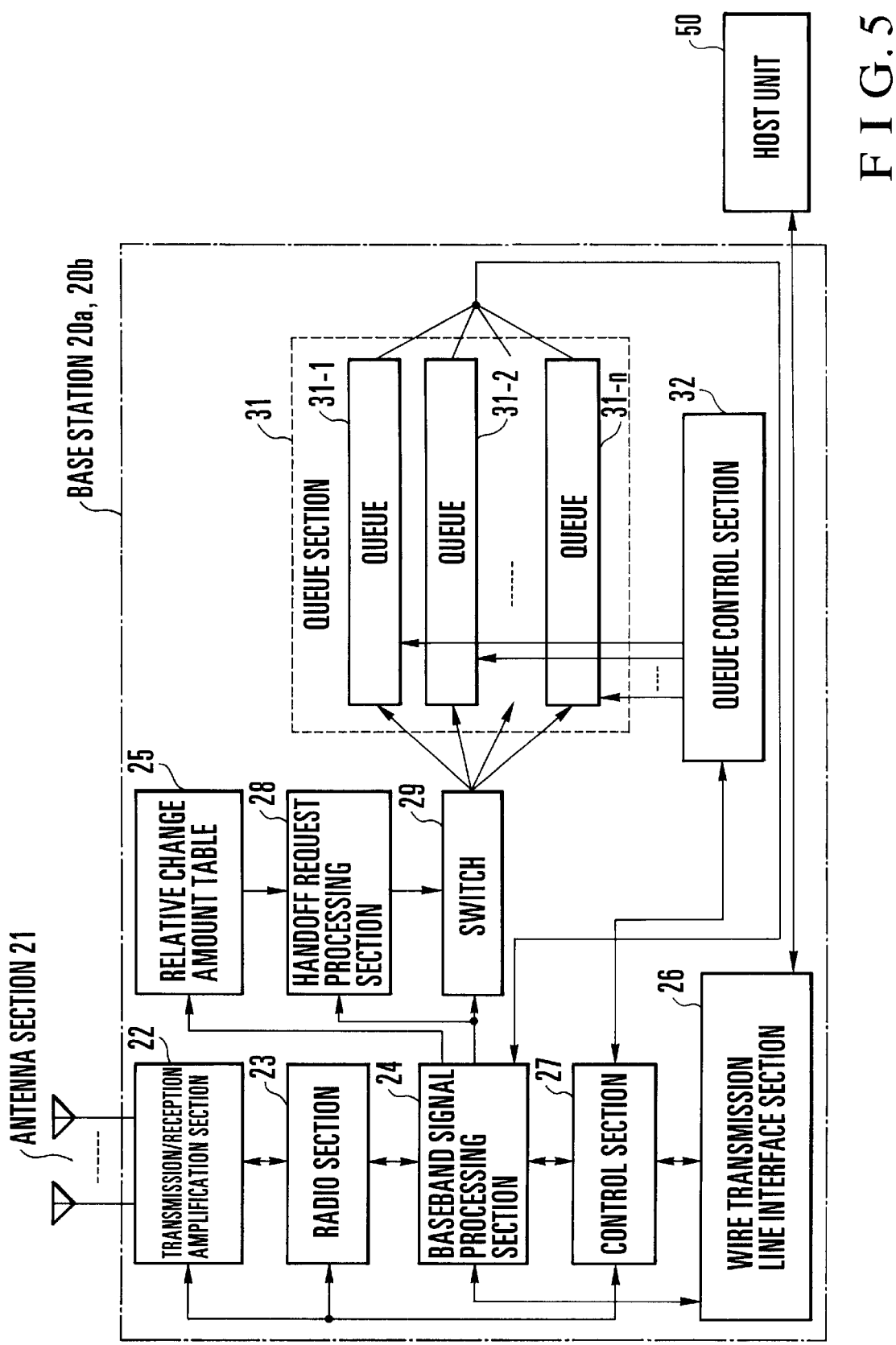
FIG. 5 is a block diagram showing a base station of the handoff control system in FIG. 1.

FIG. 5 shows each of the base stations 20a and 20b in FIG. 1.

As shown in FIG. 5, each of the base stations 20a and 20b is comprised of a pair of antenna sections 21 for receiving and transmitting radio waves, a transmission/reception amplification section 22 connected to the antenna section 21, a radio section 23 connected to the transmission/reception amplification section 22, a baseband signal processing section 24 connected to the radio section 23, a relative change amount table 25 connected to the baseband signal processing section 24, a wire transmission line interface section 26 for interfacing with an externally connected host unit 50, a queue section 31 connected to the baseband signal processing section 24, a handoff request processing section 28 connected to the baseband signal processing section 24 and the relative change amount table 25, a switch 29 connected to the baseband signal processing section 24, the handoff request processing section 28, and the queue section 31, a queue control section 32 connected to the queue section 31, and a control section 27.

The transmission/reception amplification section 22 amplifies the reception RF signal received through the antenna section 21 and the transmission RF signal to be transmitted through the antenna section 21, and demultiplexes the reception RF signal and the transmission RF signal.

The radio section 23 performs quasi-synchronous detection of the reception RF signal amplified by the transmission/reception amplification section 22, and converts the signal into a digital signal. The radio section 23 also converts the signal to be transmitted through the antenna section 21 into an analog signal, and converts it into a transmission RF signal by quadrature modulation.

The baseband signal processing section 24 performs demodulation, synchronization, and error correction decoding of the reception signal converted into the digital signal by the radio section 23, demultiplexing of data, error correction encoding and framing of the transmission signal to be transmitted through the antenna section 21, and baseband signal processing such as data modulation.

The relative change amount table 25 stores the relative change amount of reception signal strength obtained from the signal processed by the baseband signal processing section 24 and notified by the terminal 10.

The queue section 31 stores queues 31-1 to 31-$n$ to which priorities are assigned on the basis of the relative change amounts of reception signal strength. The priorities are assigned to the queues 31-1 to 31-$n$ such that the highest priority is assigned to the queue 31-1, and the lowest priority is assigned to the queue 31-$n$.

When a handoff request is output from the terminal, the handoff request processing section 28 distributes the call from the terminal to one of the queues 31-1 to 31-$n$ in the queue section 31 on the basis of the relative change amount of reception signal strength of the terminal which is stored in the relative change amount table 25.

The switch 29 switches processes of the queues 31-1 to 31-$n$ in the queue section 31 on the basis of the determination made by the handoff request processing section 28.

The queue control section 32 monitors the presence/absence of an available channel in a cell. If there is an available channel, the queue control section 32 monitors the presence/absence of a handoff call in the queues 31-1 to 31-$n$. If there is a handoff request, the handoff call is assigned to the available channel on the basis of the priories of the queues 31-1 to 31-$n$.

The control section 27 controls the transmission/reception amplification section 22, the radio section 23, the baseband signal processing section 24, the wire transmission line interface section 26, and the queue control section 32, and transmits/receives control signals to/from the host unit 50 to perform radio channel management, radio channel setting/releasing, and the like.

The operation of the handoff control system having this arrangement will be described next.

The processing operation of the handoff request processing section 28 will be described first. In the terminal 10, the reception signal strength from the base station 20$a$ is periodically measured, and the relative change amount of reception signal strength is notified to the base station 20$a$ at measurement time intervals. The relative change amount of reception signal strength of the terminal 10 notified to the base station 20$a$ is stored in the relative change amount table 25 in the base station 20$a$.

In this case, the relative change amount of reception signal strength is also notified from the base station 20$a$ to the base station 20$b$ through the wire transmission line interface section 26 and the network and stored in the relative change amount table 25 in the base station 20$b$.

The relative change amounts of reception signal strength of the terminal are classified into a plurality of classes according to the relative change amounts, and the queues 31-1 to 31-$n$ to which priorities are assigned are formed in advance in correspondence with these classes and stored in the queue section 31. Among the queues 31-1 to 31-$n$, the class exhibiting the largest relative change amount of reception signal strength corresponds to the queue 31-1 to which the highest priority is assigned, whereas the class exhibiting the smallest relative change amount of reception signal strength corresponds to the queue 31-$n$ to which the lowest priority is assigned.

As the terminal 10 moves away from the base station 20$a$, the reception signal strength from the base station 20$a$ gradually decreases in the terminal 10. In the terminal 10, the reception signal strength from the base station 20$a$ is periodically measured. When the measured reception signal strength becomes equal to or less than a predetermined handoff threshold, the terminal 10 sends a handoff request to the base station 20$a$. The handoff request sent from the terminal 10 to the base station 20$a$ is notified from the base station 20$a$ to the adjacent base station 20$b$ through the wire transmission line interface section 26 and the network.

Figure 6A:
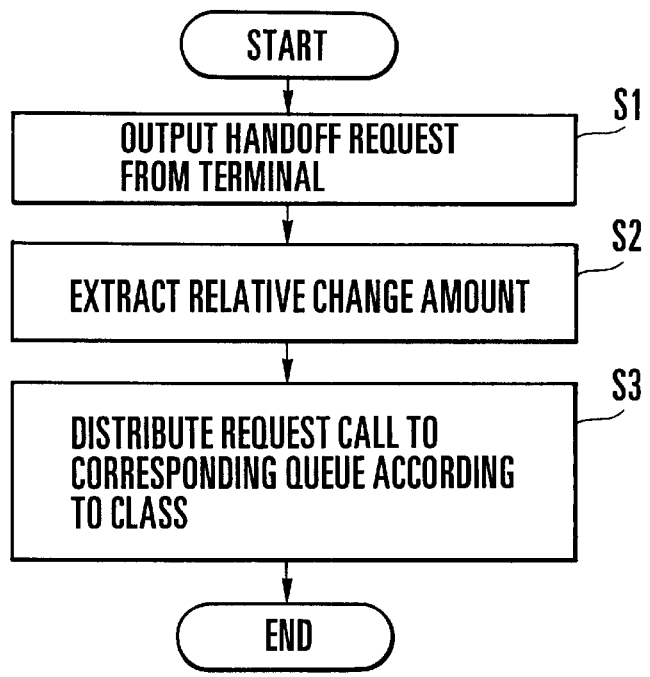
FIG. 6A is a flow chart showing a procedure for processing handoff requests in the handoff control system in FIG. 1.
Figure 6B:
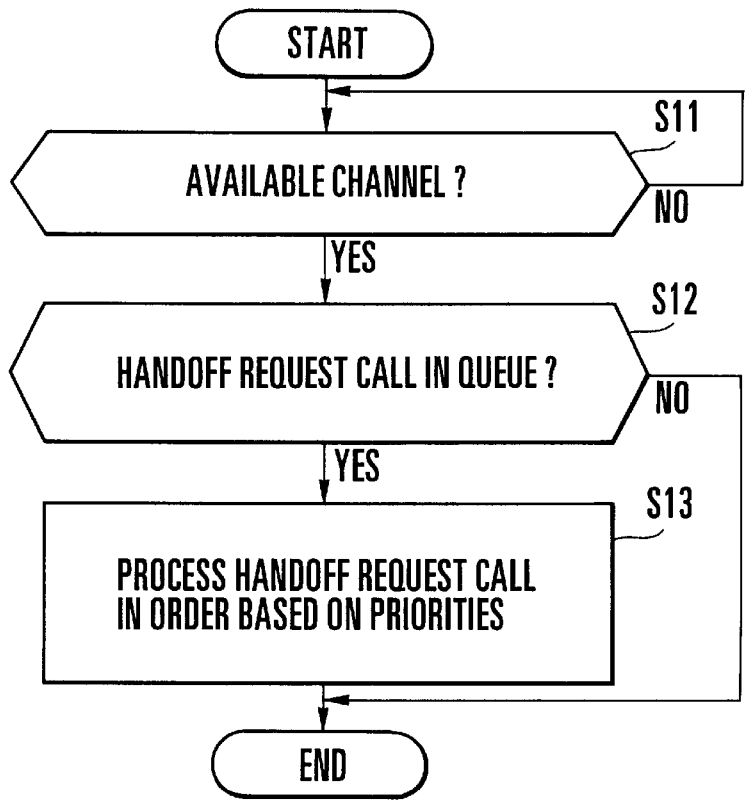
FIG. 6B is a flow chart showing a procedure for queue control in the handoff control system in FIG. 1.

The subsequent operation will be described below with reference to FIGS. 6A and 6B. When a handoff request is output from the terminal 10 to the base station 20$a$, the handoff request is sent from the base station 20$a$ to the adjacent base station 20$b$ (step S1). In the base station 20$b$, the handoff request is supplied to the handoff request processing section 28 through the antenna section 21, the transmission/reception amplification section 22, the radio section 23, and the baseband signal processing section 24. With this operation, the handoff request processing section 28 extracts the relative change amount of reception signal strength of the terminal 10, which has generated the handoff request, from the relative change amount table 25 (step S2).

The handoff request processing section 28 then controls the switch 29 to distribute the handoff request call from the terminal 10 to one of the queues in the queue section 31 which belongs to the class corresponding to the relative change amount of reception signal strength extracted in step S2 (step S3).

Meanwhile, the queue control section 32 checks whether there is an available channel in the cell 30$b$ (step S11). If it is determined in step S11 that an available channel is present, the queue control section 32 checks whether there is the handoff request call in the queues 31-1 to 31-$n$ in the queue section 31 (step S12).

If it is determined in step S12 that the handoff request call is present, the queue control section 32 assigns the handoff request call in the queues 31-1 to 31-$n$ to the available channel in the cell 30$b$ in the order based on the priorities (step S13).

In this case, since priorities are assigned to the queues 31-1 to 31-$n$ such that the highest priority is assigned to the queue 31-1, and the lowest priority is assigned to the queue 31-$n$, the handoff request call in the queue 31-1 is processed first. Subsequently, the handoff request calls in the queues 31-2, 31-3, . . . , 31-$n$ are processed in the order named. If a plurality of calls are present in the same queue, the calls are processed in the order in which they are distributed to the queue.

Assume that while a handoff request call in a given queue is processed, a new handoff request call is distributed into a queue whose priority is higher than that of the queue in which the currently processed call is present. In this case, the newly distributed handoff request call is queued until the processing for the current handoff request call is complete. When the processing for the current handoff request call is terminated, the newly generated handoff request call in the queue exhibiting a higher priority is preferentially processed regardless of whether another handoff request call is present in the same queue.

Assume that a handoff request call from the terminal 10 is left in the queues 31-1 to 31-$n$ while no relative change amount of reception signal strength is notified from the terminal 10. In this case, the queue control section 32 discards the call from the queue without performing call processing. Subsequently, a handoff request call in one of the queues 31-1 to 31-$n$ to which the next higher priority is assigned is processed.

If the terminal 10 cannot performs handoff within the handoff area, the queue control section 32 processes a handoff request call in one of the queues 31-1 to 31-$n$ to which the next highest priority is assigned without processing the handoff request call from the terminal 10.

Note that when a new call is generated, normal processing is performed.

Figure 7:
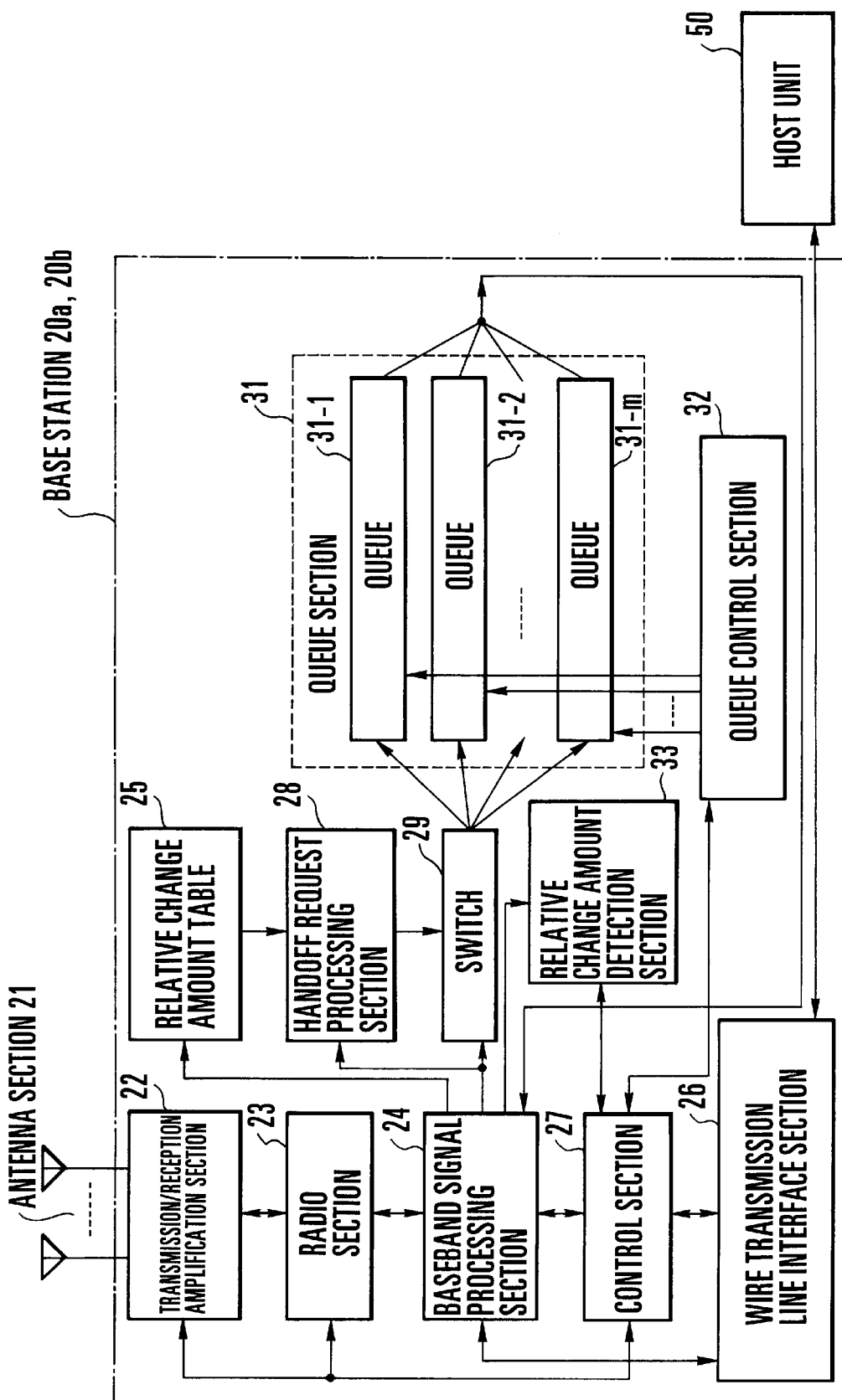
FIG. 7 is a block diagram showing a base station of the handoff control system according to a modification of the present invention.
Figure 9A:
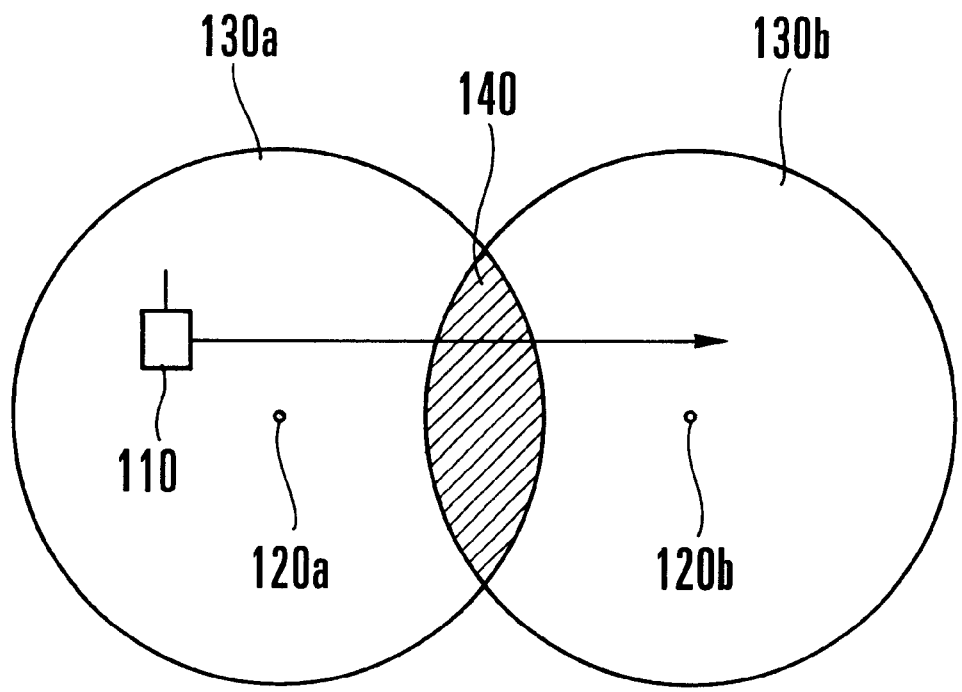
FIG. 9A is a schematic view showing a handoff control system in a general mobile communication system.
Figure 9B:
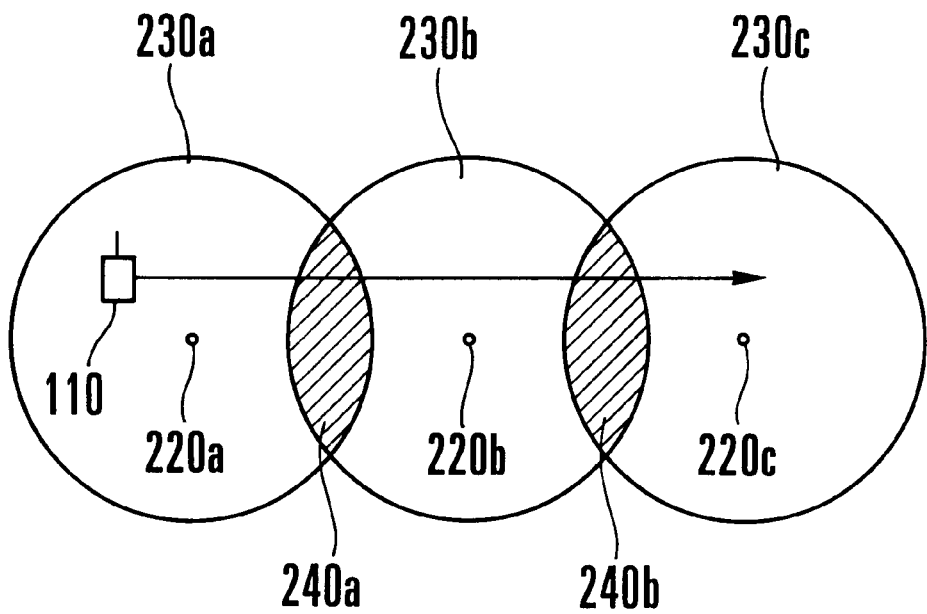
FIG. 9B is a view showing a case wherein the cell radius in the system in FIG. 9A is reduced.

As described above, in this embodiment, the relative change amount of reception signal strength in the terminal 10 is calculated by the relative change amount calculation section 15 in the terminal 10 and is notified to the base stations 20$a$ and 20$b$, together with the reception signal strength in the terminal 10. However, the present invention is not limited to this. As shown in FIG. 7, each of the base stations 20$a$ and 20$b$ may incorporate a relative change amount detection section 33 for calculating the relative change amount of reception signal strength in the terminal 10 at measurement time intervals from the reception signal strengths notified from the terminal 10. In this case, only the reception signal strengths are notified from the terminal 10 to the base stations 20$a$ and 20$b$, and the relative change amount detection section 33 of the base station 20$a$ calculates the relative change amount of reception signal strength in the terminal 10 at the measurement time intervals.

Furthermore, instead of the base stations 20$a$ and 20$b$, the switching center as the host unit 50 of the base stations 20$a$ and 20$b$ may incorporate a relative change amount detection means.

In the embodiment described above, handoff processes are performed in the order based on the moving speeds of terminals. However, since priorities are determined on the basis of the relative change amounts of reception signal strength in terminals, handoff processes may be performed in the order based on the speeds at which the terminals move away from the base station, in consideration of the moving routes of the terminals.

FIG. 8 explains control based on the moving routes of terminals in the handoff control system of the present invention.

Assume that the terminal 10$a$ moves straight toward the call 30 of the base station 20, and the terminal 10$b$ moves in the cell 20 while keeping nearly the same distance from the base station 20 for a predetermined period of time, as shown in FIG. 8. Note that the moving speed of the terminal 10$a$ is equal to that of the terminal 10$b$.

In this case, the reception signal strength in the terminal 10$a$ changes, but the reception signal strength in the terminal 10$b$ remains almost constant for a predetermined period of time. For this reason, when handoff requests are generated by the terminals 10$a$ and 10$b$, the handoff request generated by the terminal 10$a$ exhibiting a larger relative change amount of reception signal strength becomes higher in priority than the handoff request generated by the terminal 10$b$, and is processed first.

The above program for processing handoff control is written in a storage medium such as a ROM (Read Only Memory) and is read out from the storage medium when it is executed.

As has been described above, according tot he present invention, a call from a terminal exhibiting a larger relative change amount of reception signal strength (the time allowed between the instant at which a handoff request is generated and the instant at which the handoff processing is complete is shorter) can be processed prior to a call from a terminal exhibiting a smaller relative change amount (the time allowed between the instant at which a handoff request is generated and the instant at which the handoff processing is complete is longer).

The time allowed between the instant at which a handoff request is generated and the instant at which the handoff processing is complete is shorter for a terminal moving at a higher speed than that for a terminal moving at a lower speed. In addition, the time allowed between the instant at which a handoff request is generated and the instant at which the handoff processing is complete is shorter for a terminal moving away from the base station from which service is currently received than that for a terminal moving while keeping a constant distance from the base station. Therefore, the probability of forced termination of communication can be reduced at a terminal moving at a high speed and a terminal moving away from the base station from which service is currently received.

What is claimed is:

1. A handoff control system for performing handoff processing for a terminal that moves across cells of a plurality of base stations while performing speech communication, comprising:

measuring means for periodically measuring a reception signal strength in said terminal;

calculation means for calculating the relative change amount of reception signal strength at measurement time intervals on the basis of the measurement result output from said measuring means;

queue storage means storing, in advance, a plurality of queues to which priorities based on relative change amounts of reception signal strength are assigned;

request processing means for, when said terminal generates a handoff request, distributing a call from said terminal to one of the queues on the basis of the relative change amount of reception signal strength in said terminal; and queue control means for, when an available channel is present in an adjacent cell to which said terminal, which generated the request, has moved, assigning the call, distributed into the queue according to the order based on the priority, to the available channel so that calls are processed in accordance with the order of the distribution in each queue, and wherein said terminal comprises said measuring means, said calculation means, and transmission means for transmitting the calculation result obtained by said calculation means to said base station, said base station comprises said queue storage means, said request processing means, said queue control means, and interface means for notifying the handoff request from said terminal and the calculation result transmitted from said terminal to an adjacent base station, and said request processing means distributes the call from said terminal, which generated the handoff request, on the basis of the handoff request notified through said interface means and the relative change amount of reception signal strength as the calculation result.

2. A system according to claim 1, wherein said base station further comprises storage means for storing the relative change amount of reception signal strength notified through said interface means, and said request processing means distributes the call from said terminal, which generated the handoff request, to a corresponding queue on the basis of the relative change amount of reception signal strength stored in said storage means when the handoff request is notified through said interface means.

3. A handoff control system for performing handoff processing for a terminal that moves across cells of a plurality of base stations while performing speech communication, comprising:

measuring means for periodically measuring a reception signal strength in said terminal;

calculation means for calculating the relative change amount of reception signal strength at measurement time intervals on the basis of the measurement result output from said measuring means;

queue storage means storing, in advance, a plurality of queues to which priorities based on relative change amounts of reception signal strength are assigned;

request processing means for, when said terminal generates a handoff request, distributing a call from said terminal to one of the queues on the basis of the relative change amount of reception signal strength in said terminal; and queue control means for, when an available channel is present in an adjacent cell to which said terminal, which generated the request, has moved, assigning the call, distributed into the queue according to the order based on the priority, to the available channel so that calls are processed in accordance with the order of the distribution in each queue, and wherein said terminal comprises said measuring means and transmission means for transmitting the measurement result obtained by said measuring means to said base station, said base station comprises said calculation means, said queue storage means, said request processing means, said queue control means, and interface means for notifying the handoff request from said terminal and the measurement result transmitted from said terminal to an adjacent base station, said calculation means calculates the relative change amount of reception signal strength at measurement time intervals on the basis of the measurement result notified through said interface means, and said request processing means distributes the call from said terminal, which generated the handoff request, on the basis the handoff request notified through said interface means and the relative change amount of reception signal strength output from said calculation means.

4. A system according to claim 3, wherein said base station further comprises storage means for storing the relative change amount of reception signal strength notified through said interface means, and said request processing means distributes the call from said terminal, which generated the handoff request, to a corresponding queue on the basis of the relative change amount of reception signal strength stored in said storage means when the handoff request is notified through said interface means.

5. A system according to claim 1, wherein higher priorities are assigned to the queues in the increasing order of the relative change amounts of reception signal strength output from said calculation means.

6. A system according to claim 1, wherein said queue storage means stores the queues in correspondence with classes obtained by classifying the relative change amounts of reception signal strength output from said calculation means according to predetermined levels.

7. A system according to claim 1, wherein the reception signal strength output from said measuring means decreases as said terminal moves away from said base station.

8. A system according to claim 1, wherein when a terminal exhibiting a reception signal strength $P_0$ at time $t_0$ moves to exhibit a reception signal strength $P_1$ at time $t_1$, the relative change amount of reception signal strength output from said calculation means is defined by $$(P_1-P_0)/(P_1+P_0).$$

9. A system according to claim 1, wherein when a terminal exhibiting a reception signal strength $P_0$ at time $t_0$ moves to exhibit a reception signal strength $P_1$ at time $t_1$, the relative change amount of reception signal strength output from said calculation means is defined by $$(P_1-P_0)/P_1.$$

10. A system according to claim 1, wherein when a terminal exhibiting a reception signal strength $P_0$ at time $t_0$ moves to exhibit a reception signal strength $P_1$ at time $t_1$, the relative change amount of reception signal strength output from said calculation means is defined by $$(P_1-P_0)/P_0.$$

11. A handoff control method of performing handoff processing for a terminal that moves across cells of a plurality of base stations while performing speech communication, characterized by comprising the steps of:

periodically measuring a reception signal strength in said terminal;

calculating the relative change amount of measured reception signal strength at measurement time intervals;

distributing calls from terminals which have generated handoff requests to a plurality of queues, to which priorities are assigned in advance, on the basis of the calculated relative change amounts of reception signal strength;

monitoring the presence/absence of an available channel in an adjacent cell to which said terminal, which generated the handoff request, has moved; and when there is an available channel in the adjacent cell, assigning the call distributed into the queue to the available channel in the order based on priorities so that calls are processed in accordance with the order of the distribution in each queue; and wherein the step of distributing comprises the steps of:
storing the relative change amount of reception signal strength from said base station at said terminal in advance; and when a handoff request is generated, distributing a call from said terminal, which has generated the handoff request, to a corresponding queue on the basis of the stored relative change amount of reception signal strength; and said method further comprising the step of setting higher priorities in advance in the increasing order of the calculated relative change amounts of reception signal strength.

12. A method according to claim 11, further comprising the steps of:

classifying the calculated relative change amounts of reception signal strength into predetermined levels; and preparing the queues in correspondence with classified classes.

13. A method according to claim 11, wherein when a terminal exhibiting a reception signal strength $P_0$ at time $t_0$ moves to exhibit a reception signal strength $P_1$ at time $t_1$, the calculated relative change amount of reception signal strength is defined by $$(P_1-P_0)/(P_1+P_0).$$

14. A method according to claim 11, wherein when a terminal exhibiting a reception signal strength $P_0$ at time $t_0$ moves to exhibit a reception signal strength $P_1$ at time $t_1$, the calculated relative change amount of reception signal strength is defined by $$(P_1-P_0)/P_1.$$

15. A method according to claim 11, wherein when a terminal exhibiting a reception signal strength $P_0$ at time $t_0$ moves to exhibit a reception signal strength $P_1$ at time $t_1$, the calculated relative change amount of reception signal strength is defined by $$(P_1-P_0)/P_0.$$

16. A method according to claim 11, wherein when a terminal exhibiting a reception signal strength $P_0$ at time $t_0$ moves to exhibit a reception signal strength $P_1$ at time $t_1$, the calculated relative change amount of reception signal strength is defined by $$(P_1-P_0)/(t_1-t_0).$$

17. A storage medium storing a handoff control program for performing handoff processing for a terminal that moves across cells of a plurality of base stations while performing speech communication, wherein the handoff control program is executable on a computer to cause the computer to perform the steps of:

periodically measuring, in said terminal, a reception signal strength from said base station;

calculating the relative change amount of measured reception signal strength at measurement time intervals;

distributing calls from terminals which have generated handoff requests to a plurality of queues, to which priorities based on the relative change amounts are assigned in advance, on the basis of the calculated relative change amounts of reception signal strength;

monitoring the presence/absence of an available channel in an adjacent cell to which said terminal, which generated the handoff request, has moved; and when there is an available channel in the adjacent cell, assigning the call distributed into the queue to the available channel in the order based on priorities, so that calls are processed in accordance with the order of the distribution in each queue, wherein the step of distributing comprises the steps of:

storing the relative change amount of reception signal strength from said base station at said terminal in advance; and when a handoff request is generated, distributing a call from said terminal, which has generated the handoff request, to a corresponding queue on the basis of the stored relative change amount of reception signal strength; and said method further comprising the step of setting higher priorities in advance in the increasing order of the calculated relative change amounts of reception signal strength.

* * * * *